*L. W. Pond,*
*Saw Swage.*
No. 102,318. Patented Apr. 26, 1870.
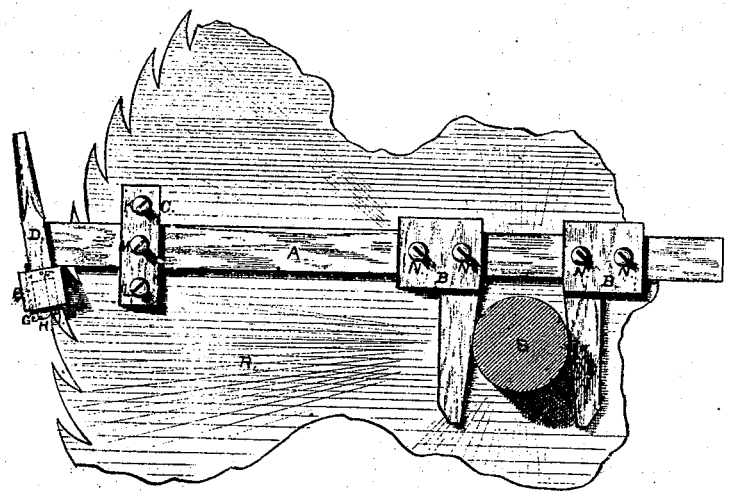
FIG. I.
FIG. II.
WITNESS.
W. Wendell
William Hornor
INVENTOR
Levi W. Pond
By H. B. Smith
his Atty in fact

United States Patent Office.

LEVI W. POND, OF WEST EAU CLAIRE, ASSIGNOR TO HIMSELF AND THE EAU CLAIRE LUMBER COMPANY, OF EAU CLAIRE, WISCONSIN.

Letters Patent No. 102,318, dated April 26, 1870.

IMPROVEMENT IN SAW-SWAGE.

The Schedule referred to in these Letters Patent and making part of the same

I, LEVI W. POND, of West Eau Claire, in the county of Eau Claire and State of Wisconsin, have invented certain Improvements in Swages for Swaging Circular Saws, of which the following is a specification.

Nature and Object of the Invention.

My invention relates to swaging and sharpening circular saws, and keeping the saws perfectly round, and arranging the pitch of the teeth.

Description of the Accompanying Drawings Forming Part of this Specification.

Figure I is a plain view of my invention.

General Description.

Figure II, a view of the piece C edgewise.

A is a straight bar, long enough to reach from the periphery of a saw to a point past the center, long enough for a clasp to be fastened on the end.

B B, a couple of clasps to clasp the mandrel on which the saw may be placed.

C, a regulating-piece on the bar A.

D, the swage-shank.

E, a clasp or shank, D, to hold the swage-blocks.

F, a pin which fastens clasp E to the shank D.

G, H, and I, blocks of steel to form the swage in clasp E, H and I, forming the swage and G a wedge to hold them firmly in position.

K and L are set-screws in the piece C, to regulate the swage by being either one or the other thrown out or screwed back, to bring the swage at the right angle to the point of the tooth.

M, a screw to hold piece C to the bar A.

N N N N, screws to hold the clasps B to the bar A.

R represents a saw.

S, the mandrel on which the saw is placed to be sharpened or swaged.

To use this apparatus, take the saw and place it on a mandrel, and straddle the clasps of the swaging apparatus onto the mandrel, so that the swage shall just rest on the point of a tooth; and, to give the pitch, regulate it by the clasps B B by placing them out or in on the mandrel, and then, with screws N N N N, set the clasps tight to the bar A; and, with set-screws K and L, regulate the swage on the points of the teeth. Then, with a hammer, strike on the outer end of shank D, and the point of the tooth will be upset and widened out.

Claims.

I claim as my invention—

1. Bar A, clasps B B, and shank D, clasps E and swage-blocks G, H, and I, substantially as described.

2. Bar A and clasps B B, constructed and arranged as set forth, for the purpose of giving pitch to the swage, substantially as described.

LEVI W. POND.

Witnesses:
    J. B. SMITH,
    WILLIAM HORNOR.